Patented Nov. 15, 1938

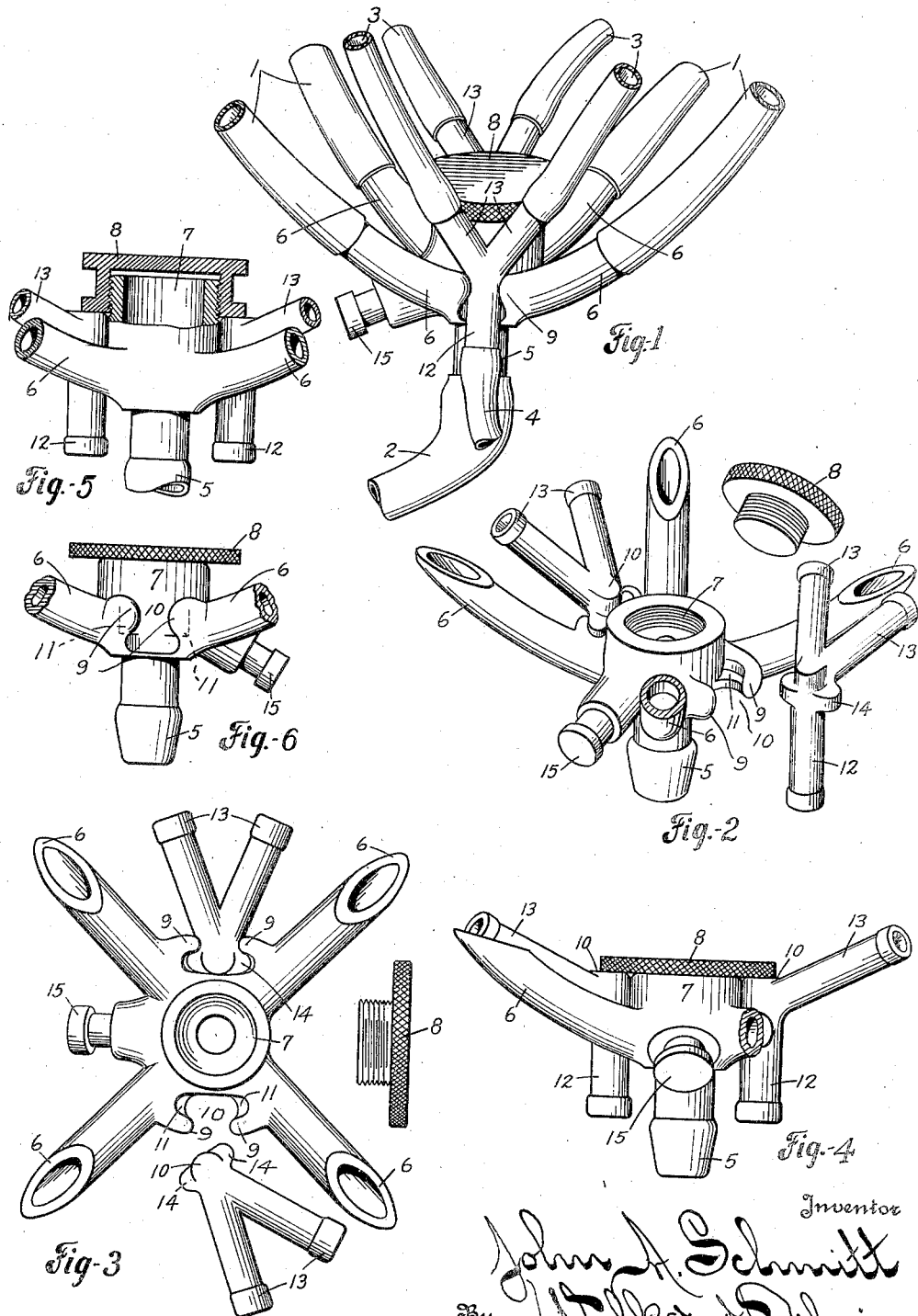

2,136,956

UNITED STATES PATENT OFFICE 2,136,956

TEAT CUP CLAW

John A. Schmitt, Waukesha, Wis., assignor to The Universal Milking Machine Company, Waukesha, Wis., a corporation of Wisconsin Application December 15, 1934, Serial No. 757,664

13 Claims. (Cl. 31—83)

This invention relates to dairying equipment, and more particularly to a teat cup claw for milking apparatus.

The teat cups of such apparatus are ordinarily arranged in a group or cluster of four cups, and are pneumatically controlled. Each teat cup is provided with its individual milk tube, and also a pneumatic control tube. The several milk tubes pertaining to the teat cups of the group are interconnected with a common milk conduit leading to a receiver. The pneumatic control tubes of the respective teat cups are interconnected in pairs with a pulsator mechanism. The branched union or tube coupling for interconnecting the individual milk tubes with the common milk conduit, and which forms the subject matter hereof, is commonly known as a "claw". The pneumatic control tubes are attached to the claw in grouped relation with the milk tubes but are without intercommunication therewith.

The present invention pertains to the arrangement of such "claw" member or tube coupling and the detachable interconnection of the pneumatic tubes thereto. It is desirable that such claw member be compact, and of relatively light weight, and it is highly important that the interior of the claw be readily accessible for cleansing. The pneumatic tubes are connected to the claw merely to keep the various tubes in a close relationship for convenient handling and to prevent entanglement.

The object of the invention is to improve the construction of milk tube claws whereby they will be more convenient, of relatively small size, compact formation, light weight, capable of being easily assembled and disassembled, and unlikely to get out of repair.

A further object of the invention is to provide a teat cup claw of the aforementioned character which will be easily and readily accessible for cleansing purposes.

A further object of the invention is to provide a convenient interlocking means for the pneumatic tubes by which such tubes may be easily confined and released.

A further object of the invention is to provide locking means for securing the pneumatic control tubes adapted to automatically release the tubes upon opening the claw for cleansing.

A further object of the invention is to provide an improved teat cup claw having the meritorious features of construction and desirable characteristics as herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the drawing, wherein is shown the preferred but obviously not necessarily the only form of embodiment of the invention, Fig. 1 is a perspective view of the claw device forming the subject matter hereof and contiguous portions of milk and air tubes interconnected thereby. Fig. 2 is a perspective disassembled view of the claw parts. Fig. 3 is a top plan view. Fig. 4 is a side elevation, and Fig. 5 is a fragmentary sectional view illustrating a modification. Fig. 6 is a detail side elevation.

Like parts are indicated by similar characters of reference throughout the several views.

Referring to Fig. 1 of the drawing, 1—1 are the individual milk tubes leading from the several teat cups of a group or cluster and which are connected by the present claw or tube coupling device with the common milk conduit 2 leading to the receiver. The pneumatic control tubes 3—3 leading from separate teat cups are interconnected in pairs with separate air tubes 4 leading to a suitable pulsator mechanism by which the teat cup inflations are subjected through such air tubes to alternate suction or vacuum impulses and air charges at atmospheric pressure or thereabove which afford the necessary massage effect to induce milk flow through the tubes 1—1 and 2.

The milk tube coupling unit is formed with a central dependent conduit 5 to which the conduit 2 leading to the receiver is connected and a plurality of intercommunicating radially disposed branch conduits 6—6 with which the teat cup tubes 1 are connected. The central common conduit 5 is somewhat enlarged at its upper end thereby forming a chamber 7 into which the lateral branch conduits 6 discharge. These conduits are preferably, although not necessarily upwardly curved to minimize kinks or sharp bends in the milk tubes 1 at their points of connection to the coupling unit.

The enlarged upper end of the central conduit is screw-threaded either inside or outside to receive a closure cap 8. This cap 8 extends peripherally beyond the enlarged end of the conduit and serves as a retaining means for the air tube couplings which are detachably engageable with the milk tube coupling. To receive such air tube couplings, sockets are formed intermediate certain branch conduits 6. Such sockets are preferably although not necessarily at opposite sides of the milk tube coupling unit. Each of the sockets comprises oppositely disposed lugs 9 spaced apart to afford a slot 10 therebetween to receive the stem portion of one of the air tube couplings. The lugs are recessed to provide opposite shoulders or seats 11 upon which the air tube coupling is suspended.

The air tube couplings consist of Y shaped conduits, the stem portions 12 of which are to be connected to the air tubes 4 while the divergent arms 13 of each member are connected to the tubes 3 pertaining to different teat cups. The divergent branch conduits 13 are disposed in a plane angular to the axial plane of the stem portion 12. They join the stem portion slightly below the upper end thereof, which is closed and provides a shoulder or terminal to receive thrust pressure. Projecting in opposite directions from the stem portion 12 below the juncture of the divergent branches 13 are supporting lugs 14 for engagement within the recessed seats 11 of the milk tube coupling unit. The slot 10 intermediate the socket lugs 9 is of sufficient width to admit the stem 12 of the air tube coupling member after which a short downward movement of the member engages the lugs 14 thereof within the recessed seats 11. The closure cap 8 is of sufficient size that when in adjusted position it overhangs and exerts thrust pressure upon the closed upper ends of the stem portions 12 of the air tube coupling members to retain such members in engaging relation within the receiving sockets. The milk tube coupling unit requires thorough and careful cleansing to keep it in a sanitary condition. To do so the closure cap 8 is removed to afford access to the interior of the several conduits 5 and 6. The disengagement of the closure cap automatically releases the air tube coupling members, which enables the cleansing to be performed without interference of the air tubes. However, while in use the air tubes are held in grouped relation with the milk tube coupling unit, thereby preventing entanglement and enabling the system of tubes to be handled collectively in a convenient manner.

Projecting from the milk tube coupling unit in a downwardly inclined position is a headed stud 15 engageable in a key hole slot in the receiver handle or in other suitable opening to suspended the assembly when not in use.

While the milk tube unit may be produced by die casting, for economy of manufacture and to insure a smooth uniform interior surface which will not collect milk deposits and which may be easily cleaned, the unit is preferably a sand casting. Such unit is formed with initially straight radial branches 6—6 which can be drilled or reamed to insure smooth interiors, after which the branch conduits 6 are bent to the desired curvature by a die operation. Such method of procedure facilitates the manufacture and minimizes cost of production, while at the same time insuring a smooth interior which may be more easily kept in a sanitary condition. In practice the closure cap 8, especially when engageable exteriorly of the coupling as in Fig. 5, preferably is provided with a transparent disc in its top affording an observation window through which the flow of milk may be observed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A coupling device for multiple tubes, including recessed head portions, a plurality of intercommunicating radial branch conduits projecting therefrom and a central dependent conduit intercommunicating with the branch conduits through the head portion, opposed notches in the adjacent sides of certain of the branch conduits, independent tube coupling members detachably engageable in said notches, and a closure cap for the recessed head portion serving to lock the independent tube coupling members within the said notches.

2. A coupling member for multiple tubes through which the tubes communicate one with another, including a vertical conduit open at its opposite ends, a plurality of laterally extending conduits communicating with the vertical conduit, a removable closure cap for one end of the vertical conduit, an independent tube coupling member, and a seat upon the first member in which the latter member is removably engageable, said member being locked.

3. A teat cup claw including a central vertical conduit, a removable closure cap for the upper end of said conduit, a plurality of laterally extending branch conduits communicating with the central vertical conduit, an independent air tube coupling, and means for holding the air tube coupling detachably engaged with the aforementioned structure by adjustment of the closure cap.

4. A teat cup claw including a central vertical conduit, a removable closure cap for the upper end of said conduit, a plurality of laterally extending branch conduits communicating with the central vertical conduit, an independent air tube coupling, and a socket formed intermediate two of the laterally extending branches within which the air tube coupling is detachably engageable.

5. A teat cup claw including a central vertical conduit, a removable closure cap for the upper end of said conduit, a plurality of laterally extending branch conduits communicating with the central vertical conduit, and an independent air tube coupling, said first mentioned structure having an undercut slot intermediate two of the lateral branches within which the air tube coupling is engageable.

6. In a structure of the character described, a tube coupling including branching arms and a stem portion of substantially Y-form, the branching arms and stem of the Y-coupling being disposed in angularly related planes, a shoulder formed at the juncture of the arms and stem, and laterally extending lugs on said stem adjacent to the juncture with the arms for engagement in a retaining socket.

7. An air tube coupling for milking apparatus comprising a stem like conduit closed at its upper end and diagonally disposed branch conduits communicating with the stem conduit contiguous to its closed end, but leaving such closed end of the stem portion exposed for engagement of a retaining device.

8. The combination with a milk tube coupling including a conduit portion to be connected with a milk receiver and multiple branch conduits communicating with the first mentioned conduit and adapted to be connected to individual teat cups, of an independent air tube coupling including a conduit portion to be connected with a pulsator and intercommunicating branch conduits to be connected with individual teat cups, a socket on the milk tube coupling in which the air tube coupling is engageable and means on said milk tube coupling for exerting thrust pressure upon the air tube coupling to hold it in said socket.

9. In a device of the character described, a milk tube coupling including a vertically aligned central dependent conduit affording a straight unobstructed passage through the coupling open at its opposite ends, said conduit being somewhat enlarged internally adjacent to its upper end, a plurality of radially extending upwardly curved branch conduits communicating with the enlarged upper portion of the central dependent conduit, the upper portion of said central conduit being screw-threaded and a screw-threaded closure cap therefor which by its removal affords easy access to the interior of the central dependent conduit and radial branch conduits to facilitate cleansing upon removal of said cap.

10. In a device of the character described, a milk tube coupling including a dependent central conduit for connection with a milk receiver and a plurality of radially disposed branch conduits for connection with individual teat cups and communicating with the dependent central conduit, and a socket formed intermediate two radial branch conduits for detachable engagement therein of an air tube coupling.

11. As an article of manufacture, a teat cup claw unit for milking apparatus including a vertical central conduit open at its top and bottom and affording a continuous straight unobstructed passage therethrough, a plurality of branch conduits extending radially therefrom and communicating laterally with said passage, a removable closure member for the upper end of the vertical conduit, the lower end of the vertical conduit being engageable with a flexible milk conduit, and means for detachably associating a plurality of air tubes with said unit.

12. A teat cup claw unit including a central vertical conduit having a substantially straight continuous unobstructed passage therethrough open at its opposite ends and a plurality of branch conduits extending radially therefrom and communicating with the vertical conduit passage and a removable closure for the upper end of the vertical conduit passage affording access thereto for cleansing.

13. A teat cup claw unit including a vertical central conduit enlarged in its upper portion to afford an unobstructed receiving chamber through which the milk may flow, a plurality of radially disposed branch conduits discharging into the chamber, said chamber having an access opening in its top, a closure for said access opening and a substantially straight axial outlet passage leading downwardly from said chamber.

JOHN A. SCHMITT.